United States Patent [19]
Kendall

[11] Patent Number: 5,247,442
[45] Date of Patent: Sep. 21, 1993

[54] VEHICULAR STEERING SYSTEM FOR REVERSE PATHS

[75] Inventor: Rodney G. Kendall, Orem, Utah

[73] Assignee: Brigham Young University, Provo, Utah

[21] Appl. No.: 765,543

[22] Filed: Sep. 25, 1991

[51] Int. Cl.⁵ ............................................. B62D 53/06
[52] U.S. Cl. ........................... 364/424.05; 280/426; 280/432; 280/DIG. 14
[58] Field of Search ...................... 364/424.07, 424.05; 280/426, 432, 442, 446.1, 448, 479.1, DIG. 14

[56] References Cited
U.S. PATENT DOCUMENTS

| | | | |
|---|---|---|---|
| 4,344,640 | 8/1982 | Ratskö et al. | 280/432 |
| 4,763,916 | 8/1988 | Ratskó | 280/432 |
| 5,013,057 | 5/1991 | Vänninmaja et al. | 280/426 |
| 5,097,250 | 3/1992 | Hernandez | 280/DIG. 14 |
| 5,098,115 | 3/1992 | Haire et al. | 280/DIG. 14 |
| 5,108,123 | 4/1992 | Rubenzik | 280/DIG. 14 |

Primary Examiner—Gary Chin
Attorney, Agent, or Firm—Trask, Britt & Rossa

[57] ABSTRACT

The components of a tractor-trailer assembly are provided with means for determining the ball angle between the tractor and trailer during backing as well as the distance and location of the backing objective with respect to the back of the trailer. Intelligence concerning these data are processed to determine the corrections required in current steering conditions to maintain a desired course of trailer travel during backing.

7 Claims, 11 Drawing Sheets

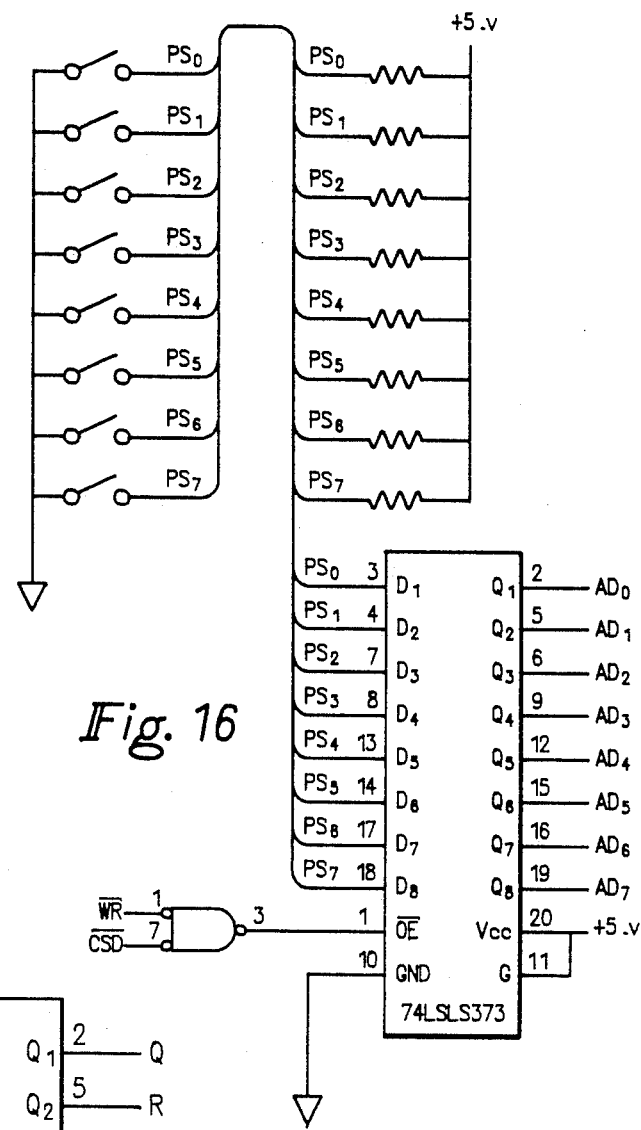
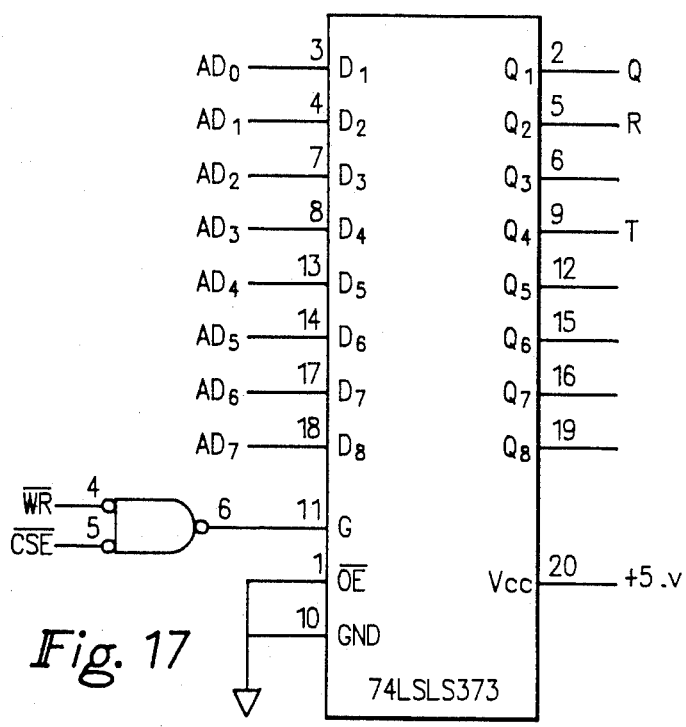
Fig. 16
Fig. 17

VEHICULAR STEERING SYSTEM FOR REVERSE PATHS

BACKGROUND

1. Field

This invention relates to objects towed by traction vehicles. It particularly relates to the accurate backing of such towed objects.

2. State of the Art

Steering a vehicle while backing up with an attached trailer is an acquired skill. Even individuals with considerable driving experience often have little occasion to develop the skills required to back a trailer. Drivers are generally frustrated with backing, particularly when the backing is done primarily with the use of mirrors. Much of the difficulty associated with backing a trailer results from the inherent positive feedback that occurs when backing.

A towing vehicle or powered component of an assembly will be referred to in this disclosure as a "tractor component." A towed object or vehicle will be referred to as the "trailer component." For simplicity, the assembly will be regarded as a "tractor-trailer assembly," even though the respective components may be otherwise identified in common parlance. For example, an automobile or truck may be regarded as a "tractor" while a cannon, if towed, might be regarded as a "trailer."

The difference between the respective directions of travel of the tractor and trailer components of the assembly may be referred to as the "ball angle." When backing (traveling in the reverse direction) with any fixed steering position, the ball angle will inevitably continue to change. In fact, the ball angle continues to change at an increasing rate per foot traveled, until the components of the assembly jackknife.

"Jackknife" is the condition in which the hitched truck and trailer collide with each other because of an excessive ball angle. This jackknife condition will always occur with any fixed steering position and continued backing.

Long distances can be driven in the forward direction with only a slight amount of steering. However, when backing a trailer, there is a constant need for corrective steering. Otherwise, a jackknife situation will occur. Hence, backing a trailer creates an inherently changeable situation that requires frequent corrective steering.

Accurate backing represents a challenge to most drivers. Yet, there has been little improvement in the equipment available to guide steering of a tractor backing a trailer. There remains a need for a manual or automated computer assisted steering system whereby backing can become a relatively simple procedure.

SUMMARY OF THE INVENTION

In its broadest aspect, this invention provides a system, including both apparatus and method components, for controlling the course of travel of a towed object during backing. The system may be completely automated to avoid any extraneous or purposeful input by a driver. In most instances, however, it is deemed advantageous for the driver to maintain control over at least the speed of travel and start/stop variables of operation. Normal concerns about safety and economy will often lead to embodiments in which the system of this invention is relied upon only to convey information to the driver, leaving it to the driver to respond appropriately.

The system may be visualized with reference to imaginary reference axes and a vector which define a ball angle and a trailer bumper angle, respectively. While it is recognized that the system set forth in this disclosure may be embodied in a variety of configurations, it is described herein with reference to a generalized case in which a tractor component is coupled to a trailer component by means of a ball hitch connection. For purposes of this disclosure and the appended claims, any towing component will be referred to as a tractor and any towed component will be regarded as a trailer. Any hitch which permits pivoting at an approximately vertical axis is regarded as equivalent to a ball hitch within the context of this disclosure, and the term "ball angle" is applied without regard to the specific construction of the hitch. Similarly, while this disclosure makes reference to a "bumper angle" and regards that angle as being defined by reference lines at the center rear of the trailer, it is recognized that an equivalent, although not necessarily equal, angle can be defined at other locations associated with a trailer. In such an event, the method steps involved in the system of this invention may be readily modified to accommodate the resulting modified input constraints.

The structural components of the system include a first sensing means constructed and arranged to determine a ball angle. Assuming that the tractor and trailer are both approximately symmetrical and that the hitch connection is positioned at an intersection of longitudinal reference axes of the tractor and trailer, respectively, the ball angle during normal straight ahead towing is zero by definition. Any turning of the tractor with respect to straight ahead travel effects a ball angle which is defined as either plus or minus, by convention, depending upon whether the steering is to the left or to the right. The first sensing means delivers input data which reflects the magnitude and sign of the ball angle to a computer, either at intervals, or more preferably continuously on a real time basis.

A second sensing means is structured and arranged to determine the bumper angle with respect to a target reference. This second sensing means functions in a fashion similar to the first sensing means to deliver input data concerning the magnitude and sign of the bumper angle, preferably continuously in real time. To determine the bumper angle, it is necessary to define the target location; that is, the precise destination to which it is desired to back the trailer. This location can be regarded as a radius vector quantity with its origin at the center rear of the trailer. This vector can be defined through the use of various optical, electronic or mechanical devices. In any event, this invention contemplates a target determination means constructed and arranged to inform the computer concerning the distance and direction of the target with respect to a reference point on the trailer, preferably at the center of its rear.

According to this invention, a desired course of trailer travel towards the target during backing is maintained by intermittently, and at frequent intervals (ideally continuously) adjusting the steering of the tractor so that the ball angle approximates the bumper angle. The computer may simply drive display means which informs the driver concerning these angles. It is generally more useful for the computer to determine and display the amount and direction of steering correction required at any given time. The driver may then react as appropriate. Alternatively, the entire system may be automated so that the steering of the tractor is powered by a drive means controlled by the computer.

This invention provides either an automated or manual computer-assisted steering system for backing a tractor with an attached trailer. The system operates to continuously define a destination (target reference) point. The target vector continuously changes as its origin moves with the trailer. The relative orientation of the target, trailer or tractor are sensed and correlated to determine appropriate steering corrections during backing.

As used in this disclosure unless otherwise clear from the context, the following terms are used as follows:

"A/D Converter"—a device which converts analog input to digital output

"Asynchronous state machines"—clockless sequential machines that hold states in accordance with the sequence in which the input signals are received.

"Ball"—The tractor-mounted ball element of a coupling assembly that moves within a trailer-mounted hitch element. This coupling assembly connects the trailer to the tractor.

"Ball angle"—The deviation from straight ahead travel assumed by the trailer with respect to the tractor.

"Ball angle error"—The difference between the current ball angle and the desired ball angle.

"Bumper angle"—The angle of line of sight to a target from the rear of the trailer with respect to the center axis of the trailer.

"Corrective steering"—The steering required to maintain the tractor-trailer assembly backing in the desired course of travel.

"Desired ball angle"—A ball angle that will cause the trailer to comply more nearly to the desired course of travel while backing directly toward the target.

"Done Button"—A switch that signals to the computer to begin backing to the defined target.

"Electric Steering Motor"—The device used to electrically alter the position of the truck steering.

"First level decoding"—The primary (or first level) partitioning of memory with a decoder in a microcomputer chip.

"I/O"—The interface of the computer to the outside world. This interface is often called "input-output."

"Intermediate shaft"—The rod of steel with associated sprockets and chains used for gear reduction. This shaft holds the sprocket that drives the steering sector shaft (steering wheel shaft).

"Irreversible Jackknife"—When the current ball angle is greater than the largest ball angle achievable in a sharp turn in the forward direction.

"Jackknife"—The condition in which the tractor and trailer collide with each other because of an excessive ball angle.

"Microcomputer"—A microprocessor system that requires a certain minimum amount of hardware (microprocessor, memory, and I/O circuitry).

"Oversteer"—A figure of merit for the amount of corrective steering applied to redirect the trailer during backing.

"Pivot arm"—The arm mounted on a potentiometer shaft such that a computer can measure the arm direction.

"Positive feedback"—The return, to the input, of a part of the output of a machine such that the action is reinforced.

"Second level decoding"—A decoder that is enabled by the principal system decoder to further subdivide a block of memory.

"Steering count"—A number maintained by microcomputer software to keep track of the current steering wheel position. Typically, there are 16 negative positions and 16 positive positions with "0" representing straight-ahead travel.

"String"—A vector quantity which defines the current trailer bumper direction and distance with respect to the target.

"Trailer"—The unpowered articulated vehicle component that is towed or backed by the tractor component of a tractor-trailer assembly.

"Tractor"—The powered or towing vehicle that is steered.

"Turning radius"—The radius of the path of the tractor and trailer.

According to this invention, a trailer is accurately backed by first identifying how it is oriented with respect to the target. The trailer is then positioned by appropriately and repeatedly re-orienting the tractor with respect to the trailer. This reorientation is done by steering the tractor correctly. First, the bumper angle of the trailer is determined by an appropriate sensing means. The bumper angle is minimized by adjusting the ball angle. The ball angle may also be determined by an appropriate sensing means and constitutes one way to express the turning radius or steering of the trailer. The ball angle is adjusted by steering the tractor. When the trailer is too far right, the steering must be turned farther right than the steering required to maintain the current ball angle in the forward direction. When the trailer is too far left, the steering must be turned farther left than the steering required to maintain the current ball angle in the forward direction.

An approximation of the desired ball angle can be obtained directly from the current bumper angle. For example, if the current bumper angle is −15 degrees (trailer on driver's side), then an approximation of needed ball angle is −15 degrees. With the steering adjusted to reposition the trailer to assume a −15 degree ball angle, the trailer will move more towards the target. As the trailer moves close to the target, the bumper angle decreases toward zero. This change is observed by the sensing means which functions to either signal or effect automatically a steering adjustment appropriate to produce a smaller ball angle. The bumper angle then continues to drive the system to effect steering corrections as the trailer backs toward the target. Maintaining the ball angle close to the changing bumper angle causes the trailer to comply more closely to a course of travel which approximates backing directly toward the target. This process continues until the bumper angle and ball angle are both zero degrees.

To maintain a given ball angle in reverse steering, the appropriate correcting steering depends very much on the ball angle error. This consideration is particularly significant when a large ball angle error results from a newly established "desired ball angle." The larger the error, the larger the corrective steering needed. If insufficient corrective steering occurs, the trailer will continue further in the errant direction until a jackknife occurs. The number of reverse feet required to correct an error depends almost solely upon the amount of correcting steering applied.

In fact, steering to the very limits of the tractor would in theory always correct any error in the shortest reverse travel. Such an approach would be desirable if the most rapid correction possible superseded all other considerations. A drawback to such an approach, however, is the inability of the equipment involved to steer quickly enough to make the steering compliant without introducing error through excessive steering. As a practical matter, it is normally most expedient to correct steering only enough to accomplish the desired result; to correct the current ball angle.

BRIEF DESCRIPTION OF THE DRAWINGS

In the drawings, which illustrate that which is presently regarded as the best mode for carrying out the invention:

FIG. 16 is a schematic diagram of an input port circuits;

FIG. 17 is a schematic diagram of an output port circuits;

DESCRIPTION OF THE ILLUSTRATED EMBODIMENT

Figure 1:
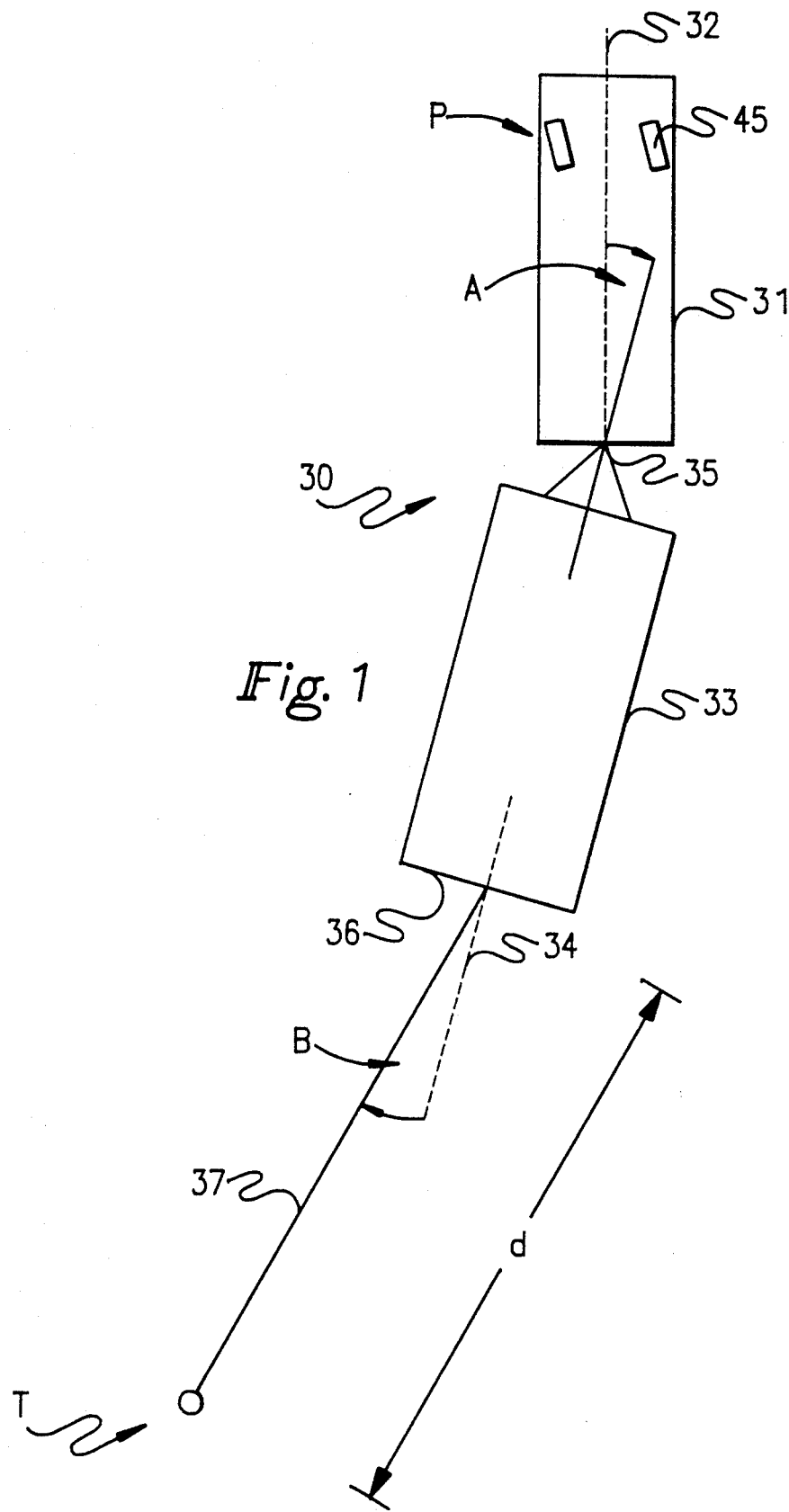
FIG. 1 is a schematic illustration of the components of a tractor-trailer assembly equipped with the system of this invention.

As shown by FIG. 1, a tractor-trailer assembly, designated generally 30, includes a tractor component 31 in which may be visualized a longitudinal reference axis 32. The assembly 30 further includes a trailer component 33 in which may be visualized a longitudinal reference axis 34. In straight ahead towing conditions, the axes 32 and 34 lie in a common plane which also intersects a ball hitch coupling 35 and the rear bumper 36 of the trailer. A string 37 extends from the bumper 37 to a target T.

Figure 2:
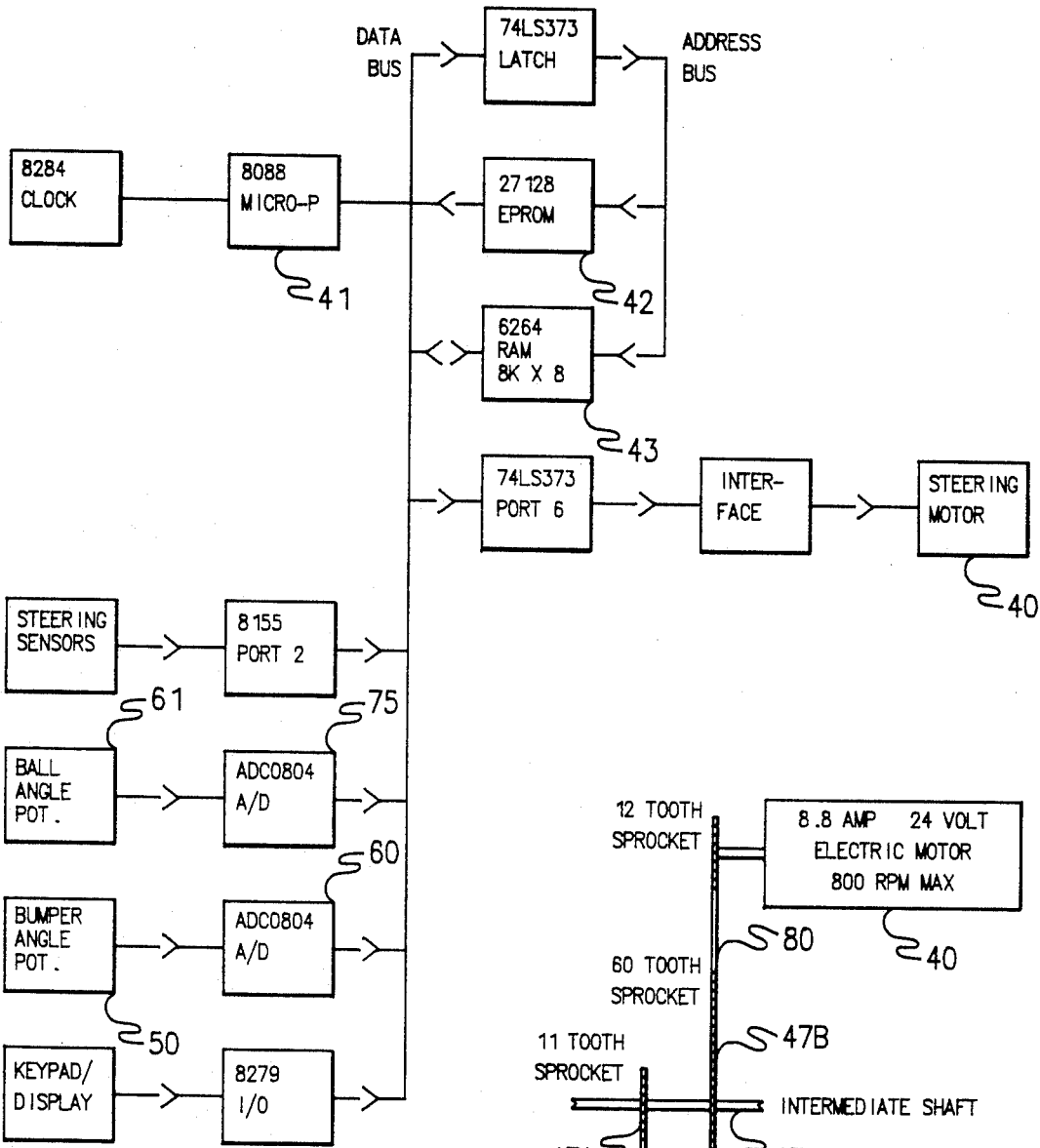
FIG. 2 is a block diagram of a typical automated system of this invention.

An 8088 microcomputer was used to control a motor 40 (FIG. 2) automatically to correctly turn the steering wheel of a pickup truck in response to sensed differences between the angles A and B. An electric motor 40 was used, (as opposed to an indicating device that gives the driver steering instructions), to eliminate errors which might otherwise have been introduced by the driver. This approach also eliminated the possibility of the driver's trying to improve upon (cheating) the steering indicated by the computer. It is recognized that manual steering may be preferred in many practical applications. An overall block diagram of this system is shown by FIG. 2.

The microprocessor 41, EPROM 42, and RAM 43 constitute the fundamental microcomputer used. The lower portion of FIG. 2 shows the I/O (input/output) elements of the system.

The computer inputs selected are shown in FIG. 1, as follows: the current position P of the steering wheel; the ball angle A of the truck tractor bumper 36 with respect to the drawn vehicle trailer 33; the bumper angle B of the string 37 with respect to the trailer axis 34; and the distance d of the trailer bumper 36 to the desired target point T.

To back towards the target T, the driver would follow these steps: 1) set the steering wheels 45 of the truck 31 for straight ahead; 2) start the computer program to initialize the software and wait; 3) withdraw string 37 to the desired target T; 4) press "done" button to tell the computer that the driver is ready to start backing; 5) allow the computer to continuously monitor the current steering position P; the current ball angle A; the current bumper angle B; and the distance d to the target T; and to effect corrective steering accordingly.

Figure 3:
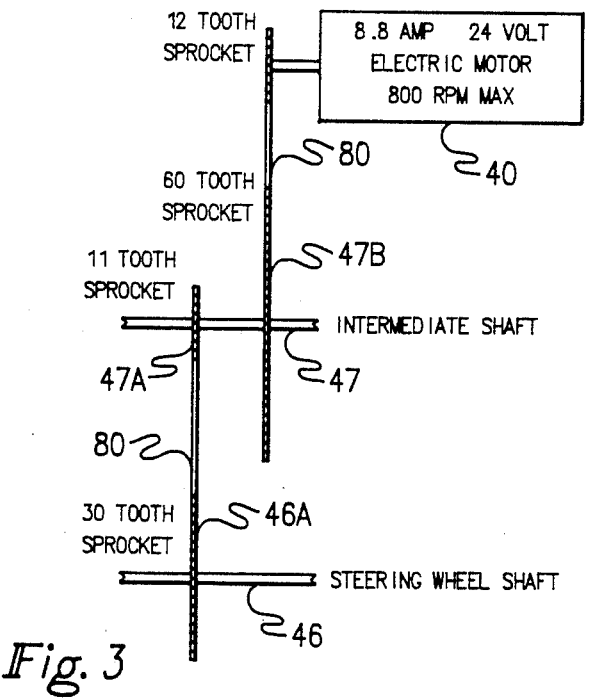
FIG. 3 is a schematic illustration of a drive motor and transmission of the invention.

The sensing of the steering was integrated into the same system as the electric steering. A #10 chain sprocket 46A with 30 teeth was mounted on the steering wheel shaft 46 of the steering sector of the pickup truck. This sprocket was driven by an 11 tooth sprocket 47A mounted on an intermediate shaft 47. The intermediate shaft was driven by a 60 tooth sprocket 47B, which was in turn driven by a 12 tooth sprocket 48A the shaft 48 of 8.8 AMP, 24 volt DC electric motor 40, all as illustrated by FIG. 3.

Magnets (not shown) were mounted on the 60-tooth sprocket; two magnetically actuated switches were mounted side by side, close to this sprocket, such that the magnets would pass the switches as the sprocket turned. The two switches were actuated by the passing magnets in such a way as to generate a quadrature output, as shown by FIG. 4.

Figure 4:
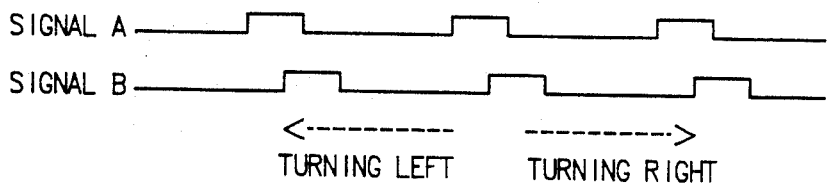
FIG. 4 is a schematic diagram of output signals generated by the transmission of FIG. 3.
Figure 5:
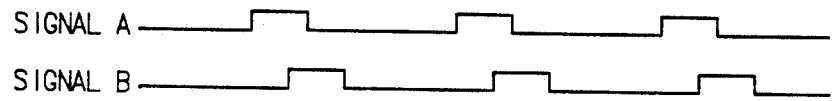
FIGS. 5 and 6 illustrate waveforms generated by the output signals of FIG. 4 under steering conditions.
Figure 6:
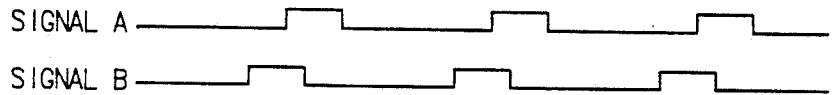

The output information illustrated by FIG. 4 permitted precise tracking of steering changes by the computer. When turning right, the waveform illustrated by FIG. 5 was generated, whereby on the rising edge of signal A, signal B was always a 0. By contrast, the waveform of FIG. 6 was generated when turning left, whereby on the rising edge of signal A, signal B was always a 1. The current direction of turning was known by reading the level of signal B each time signal A made low to high transition.

The computer was initialized when the steering was known to be set for straight ahead. Thus, the computer was continuously informed of the current steering position. The computer was thereby able to turn the steering to any desired position at any time, thus allowing any steering radius to be assumed at any time.

It was first necessary to define for the computer the tractor 31 and trailer 33 positions with respect to the target T. An inexpensive string 37 was used for this purpose because it was quick to spool, and its distance d and direction B from the rear trailer bumper 36 to the target T could be easily measured.

The string 37 was spooled on the shaft of a DC motor, connected in series with a non-linear ballast resistor. This arrangement assured constant tension, even when the string was not moving. An optical encoder was affixed to the motor to indicate to the computer the current distance d to the target T.

Figure 7:
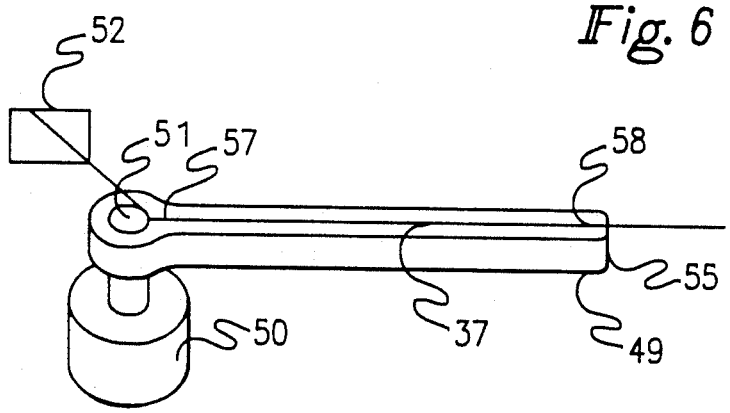
FIG. 7 is a schematic illustration of a bumper sensing means arrangement.

String 37 was dispensed to the pivot arm 49 of a linear 10K potentiometer 50 as shown by FIG. 7. The pivot point 51 of the arm 49 was situated near the spool 52 so that the distal end 55 was free to swing in compliance with the string 37. Each end of the pivot arm 49 carried an eyelet 57, 58 through which the string 37 was threaded. This arrangement forced the arm 49 to assume the same angle B with respect to the trailer bumper 36 as did the string 37. A bracket (not shown) was fabricated to mount the potentiometer 50 and associated pivot arm 49 on the bumper 33 of the trailer 32. The potentiometer shaft 51 was mounted with its axis approximately vertical. This bracket also held the motor and spool 52 of string. The potentiometer setting was read by an analog-to-digital converter 60 (FIG. 2); the computer therefore receiving continuous information on the current orientation of the trailer with respect to the target.

Figure 8:
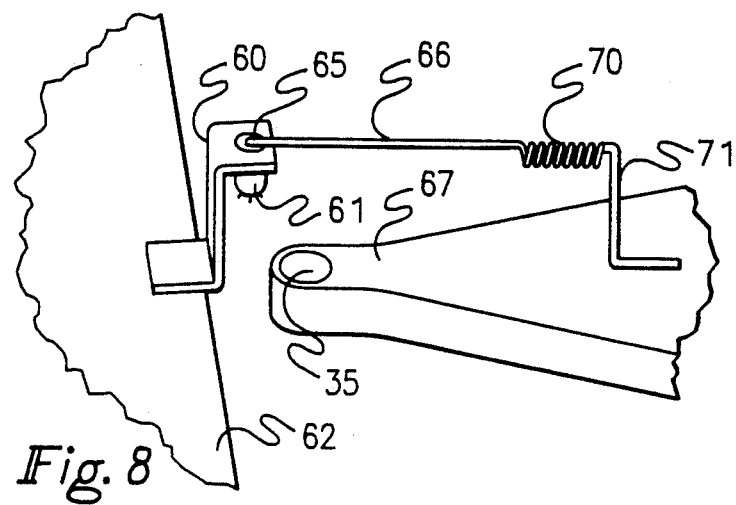
FIG. 8 is a schematic illustration of a ball sensing means arrangement.

Referring to FIG. 8, a bracket 60 was fabricated to facilitate the mounting of a linear 10K potentiometer 61 on the tractor bumper 62 above the ball hitch 35. The vertically mounted potentiometer shaft 65 was turned by an aluminum arm 66 mounted at a right angle to the shaft 65. This arm 66 was attached to the trailer tongue 67 with a spring 70 and bracket 71, such that the arm 66 assumed the same angle A as did the trailer axis 34 with respect to the tractor axis 32. The potentiometer 61 setting was read by an analog to digital converter 75, the computer therefore receiving continuous information on the current orientation A of the trailer with respect to the truck.

Figure 9:
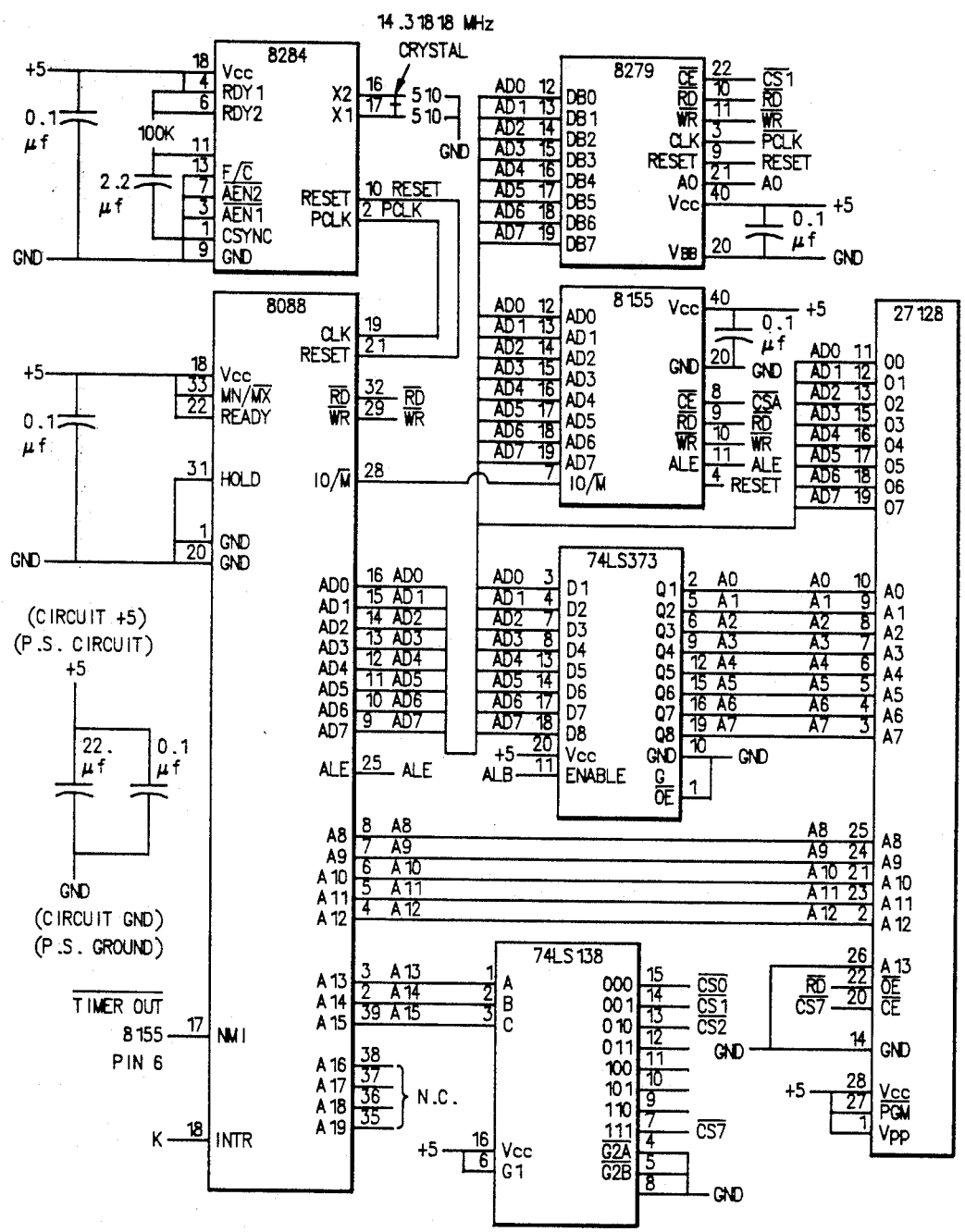
FIG. 9 is a schematic diagram of an 8088 computer steering control.

The major elements of this 8088 microcomputer used to control the steering are shown schematically by FIG. 9. Use of the 8088 microprocessor facilitated software development on a common MS-DOS personal computer.

The upper 4 bits of the 8088 address bus ($A_{16}$–$A_{19}$) were not latched or used in any way. Therefore the entire software and hardware development was based upon a maximum of a 64K byte machine architecture. Decoding was provided by two, 3 to 8 decoders (74LS138) as shown in FIG. 10 and FIG. 14.

Figure 10:
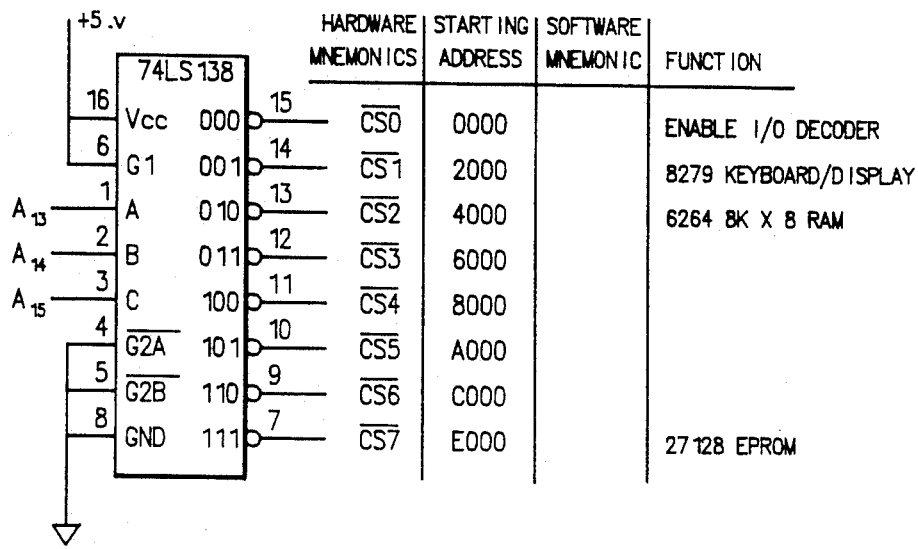
FIG. 10 is a schematic diagram of a first level decoding circuit.
Figure 11:
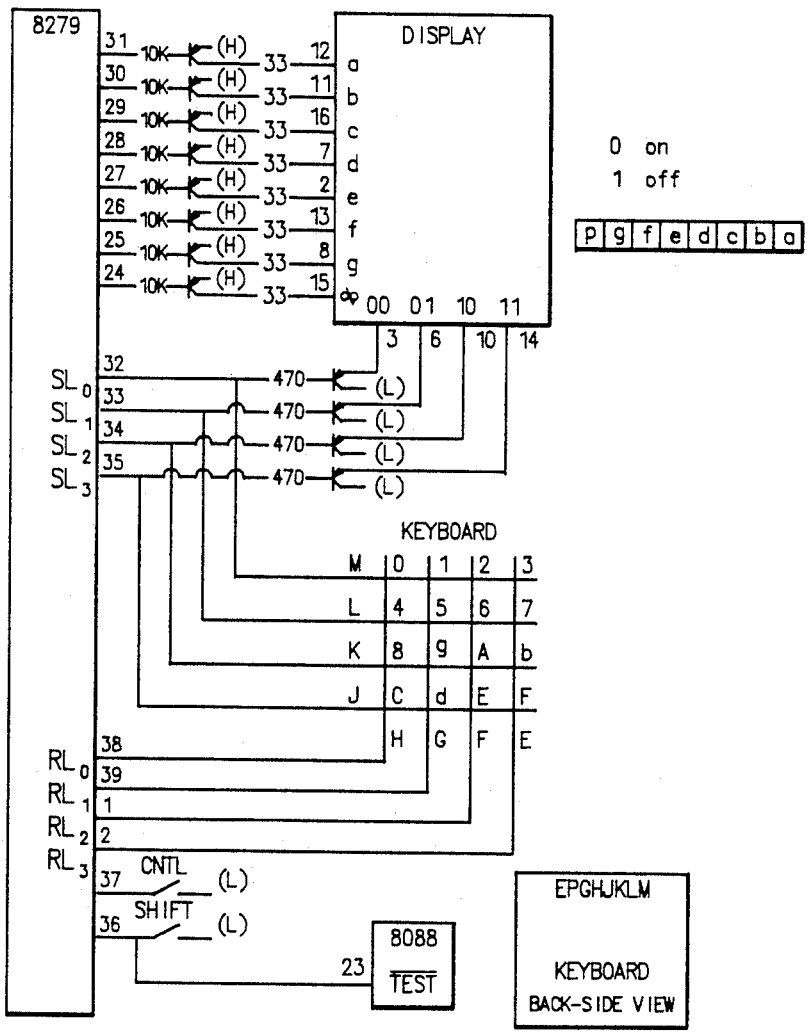
FIG. 11 is a schematic diagram of a keyboard and display wiring circuit.
Figure 12:
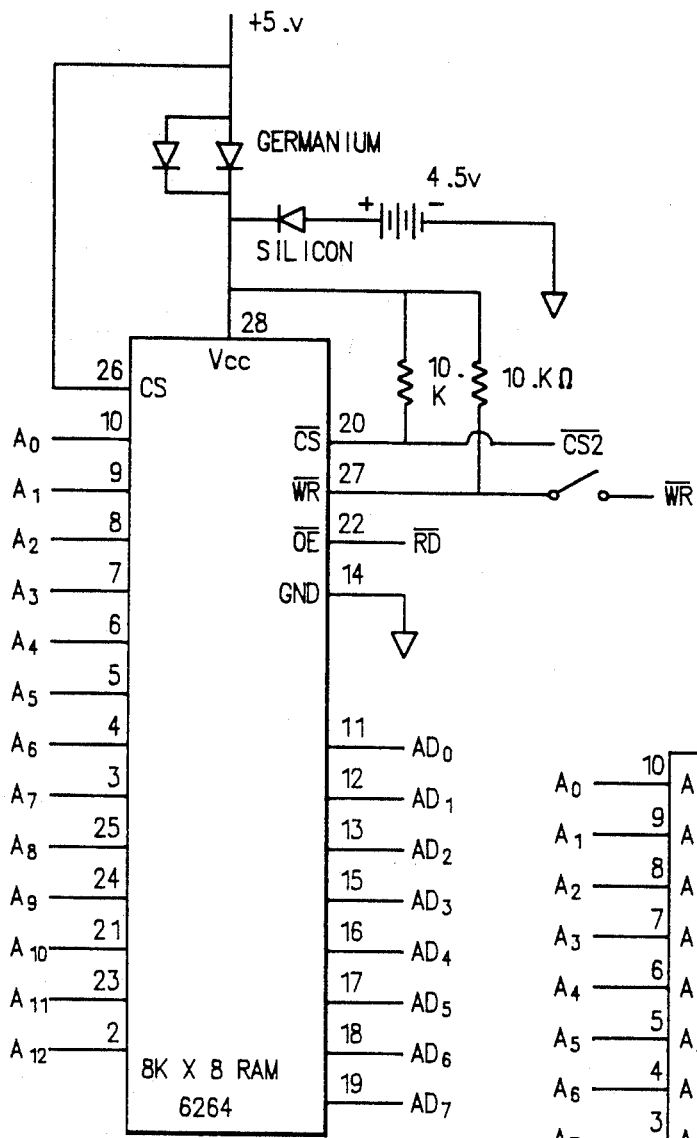
FIG. 12 is a schematic RAM diagram.
Figure 13:
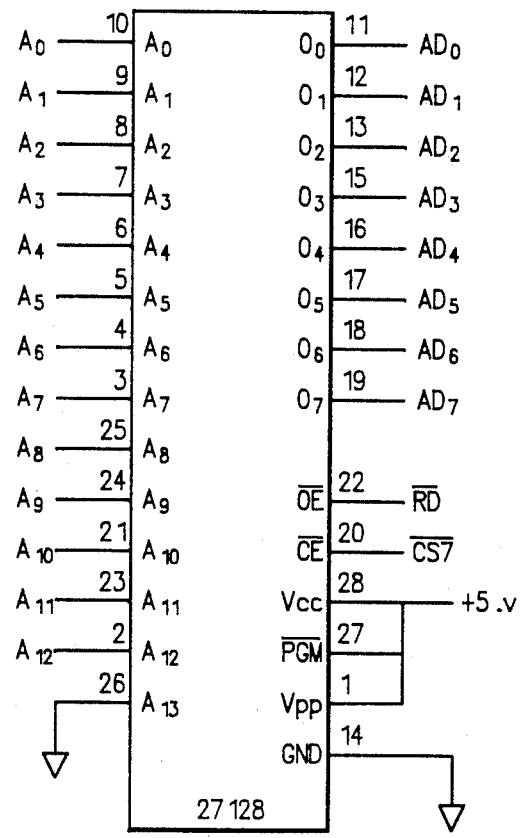
FIG. 13 is a schematic EpROM diagram.

The first decoder's select lines were connected to A15, A14, and A13, thereby providing eight decoded blocks, with 8,192 addressable bytes in each block (FIG. 10). As shown, the $000_2$ decoder output (address 0000-1FFFh) enables a second decoder (FIG. 14). The $001_2$ decoder output (address 2000-3FFFh) enables an Intel 8279 integrated circuit (IC) (FIG. 11). The 8279 is a keyboard and display interface chip. A 4-digit display and a 4 by 4 keypad (16 keys) were used to assist in software development and troubleshooting. The $010_2$ decoder output (address 4000-5FFFh) enables a Hytachi 6264 IC (FIG. 12). This chip is an 8KX8 static RAM with battery backup capability. Only a small portion of this memory space was used for software variables. The $111$ decoder output (address E000-FFFFh) enables a 27128 EPROM, which has 16K of nonvolatile memory. Only 8K of this memory was addressable by virtue of hardware simplification which grounded the most significant address line of this chip. This chip contains a "monitor" program as well as the steering software for this example (FIG. 13).

Figure 14:
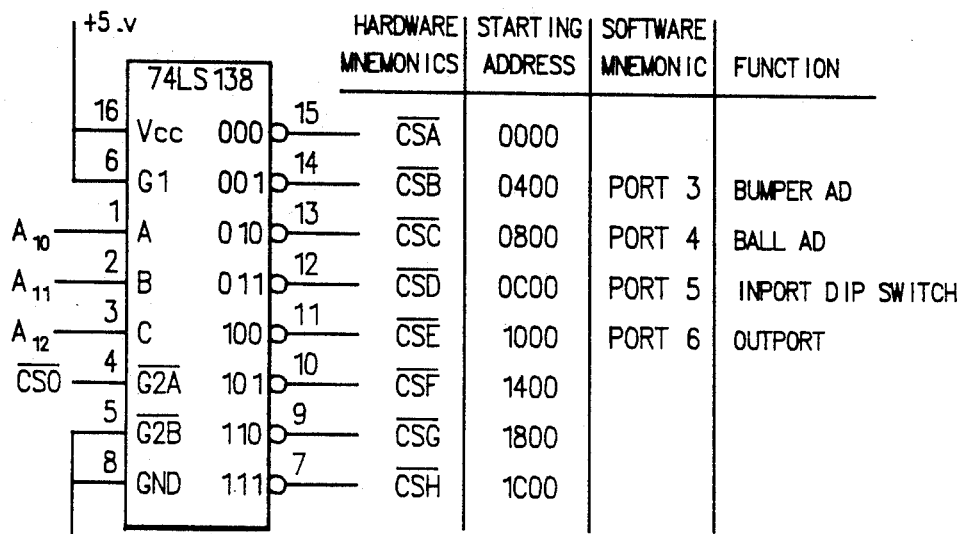
FIG. 14 is a schematic diagram of a second level decoding circuit.
Figure 15:
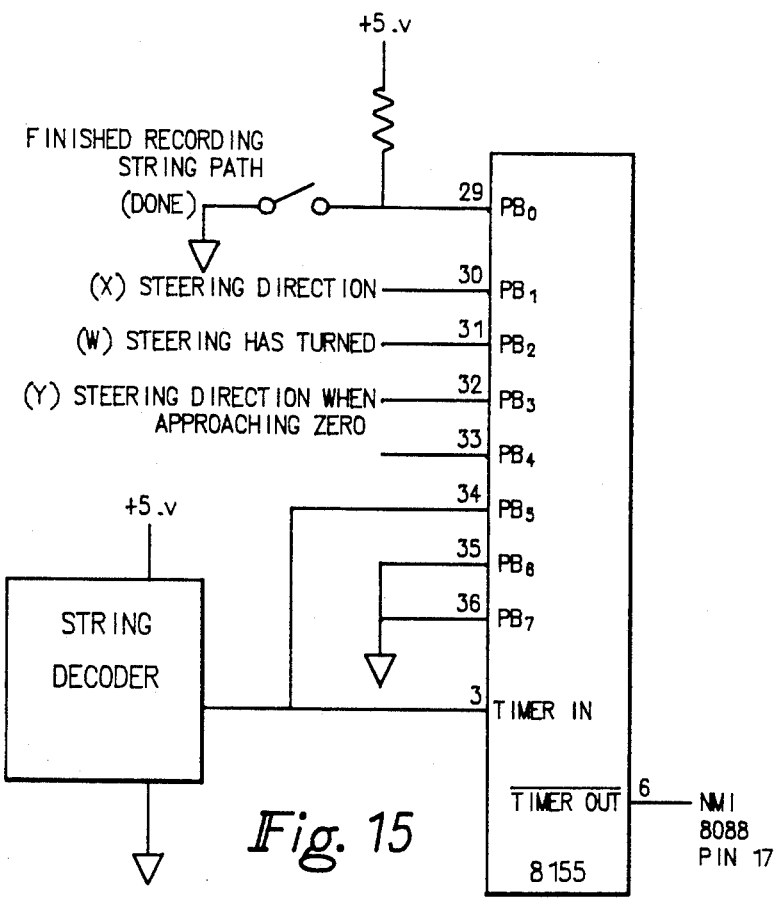
FIG. 15 is a schematic diagram of a target distance encoder circuit.
Figure 21:
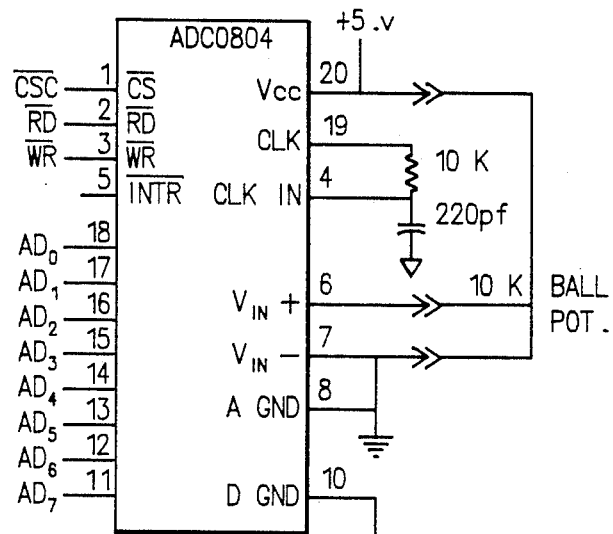
FIG. 21 is a schematic wiring diagram of a ball A/D converter circuit.
Figure 22:
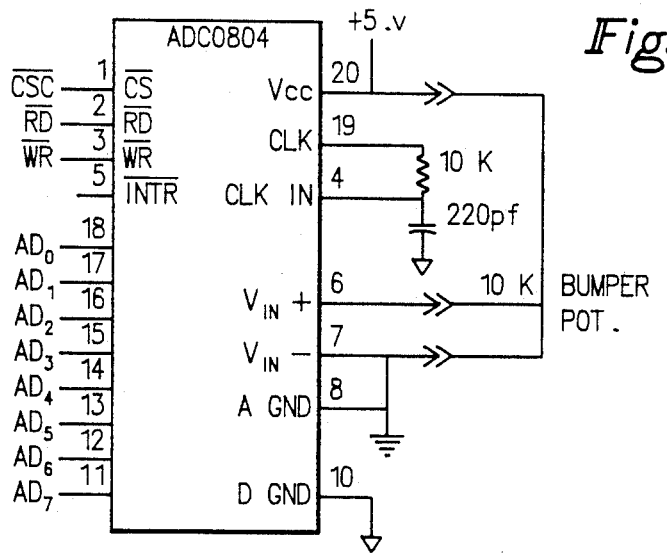
FIG. 22 is a schematic wiring diagram of a bumper A/D converter circuit.

FIG. 14 illustrates second level decoding. The $000$ decoder output (address 0000-03FFh) enables an Intel 8155 integrated circuit which contains three functionally separate devices. First, a 256X8 RAM, used for interrupt vectors and stack memory. Second, three input/output ports, used for various I/O's in this example. Third, a 14 bit counter/timer, used to divide the string distance information supplied by an optical encoder (FIG. 15). The $001_2$ decoder output (address 0400-07FFh) enables a National Semiconductor ADC0804 8 bit analog to digital converter 60, connected to the analog potentiometer 50 on the bumper 36 of the trailer 32, indicating the angle B of the string with respect to the axis 34 (FIG. 22). The $010_2$ decoder output (address 0800-0BFFh) enables digital converter 75 connected to the analog potentiometer 61 which senses the ball angle A between the trailer axis 32 and truck axis 34 (FIG. 21). The $011_2$ decoder output (address 0C00-0FFFh) enables a 74LS373, which is wired as an input port, with the input provided from an octal DIP (Dual In Like Pack) switch. The DIP switch inputs were used with various debugging and troubleshooting software routines (FIG. 16). The $100_2$ decoder output (address 1000-13FFh) enables a 74LS373 wired as an output port as shown in FIG. 17. Primarily these outputs were used to control the relays associated with the steering motor.

Steering switch debouncing was accomplished by use of an asynchronous state machine. The steering motor turned at 800 RPM, driving a 12 tooth sprocket which drives a 60 tooth sprocket at a speed of 160 RpM, or 2.67 revolutions per second; that is, 960 degrees per second. The magnetic switches were actuated by a magnet on this sprocket through 20 degrees of rotation; that is, for only 20.8 milliseconds. The goal was to provide reliable information to the computer on the exact location of the steering. Ignoring switch bounce, FIG. 4 illustrates the quadrature waveform output from the two magnetically actuated switches from the steering sprocket.

The design goal was to provide a debounced "W" signal to indicate movement of the steering wheel, and an "X" signal indicating which way the wheel was turning when in the $11_2$ (A=1 and B=1) state. The W signal makes a positive transition when the $11_2$ is entered and a negative transition when the $00_2$ is entered. When this information is combined with $00_2$ "Y" input information on steering direction, it is possible to assess with certainty which way the wheel is going. When the W signal goes low, the Y signal indicates the direction at the time the $00_2$ is entered. This precaution was considered necessary to overcome the condition when the steering wheel is moved slightly back and forth, many times yielding no real turning.

Figure 18:
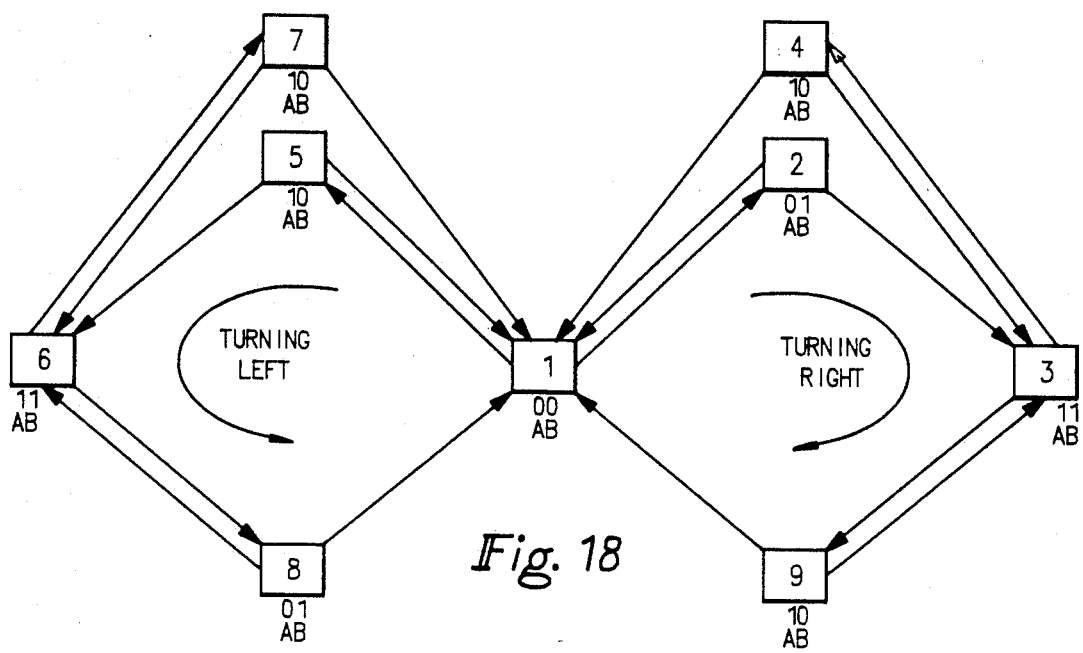
FIG. 18 is a bubble diagram of an asynchronous state machine.

As the steering turns to the right, the asynchronous state machine advances to the progressive states, as shown in FIG. 18. This asynchronous state machine bubble chart shows this progression, as well as states for switch bounce.

Figure 19:
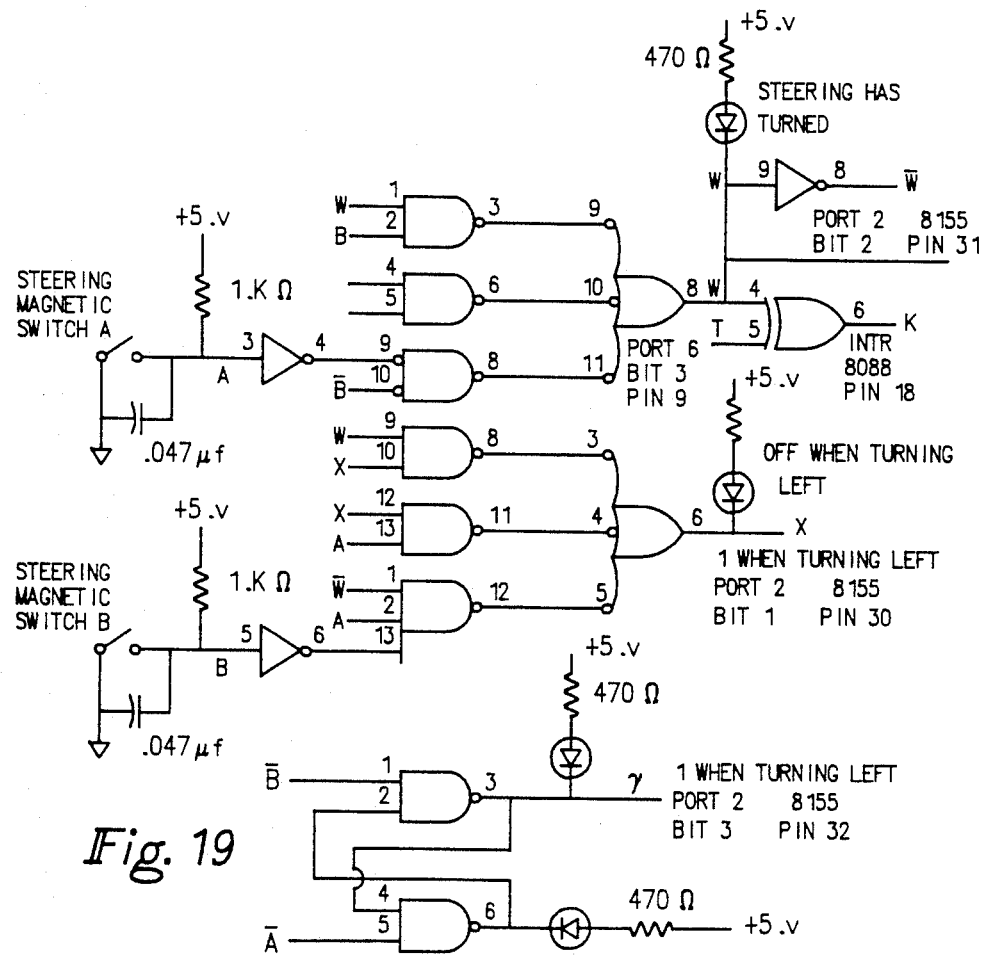
FIG. 19 is a schematic wiring diagram of an asynchronous state machine.

The circuit illustrated by FIG. 19 provides two crucial signals. First, the W output assumes the 1 condition whenever the sensor switches A and B indicate $11_2$ (base 2 representation showing both magnetic switches are close to the magnet). The W output will remain a 1 until the 00 input condition is received. This output delivers the "turning" signal, because continuous turning of the steering will produce a debounced square wave signal from this output. Second, the X output indicates which direction the steering is turning at the time the W output goes high.

The circuit outputs X and W effect steering direction at the time the 00 output condition occurs. It would be possible for the steering to move back and forth between the $11_2$ and $00_2$ conditions and not actually be turning at all. The FIG. 19 circuit indicates that the steering went from the $00_2$ condition to the $11_2$ condition and the direction it was turning at that time. The Y output indicates the turning direction at the time the $00_2$ condition is entered.

Figure 20:
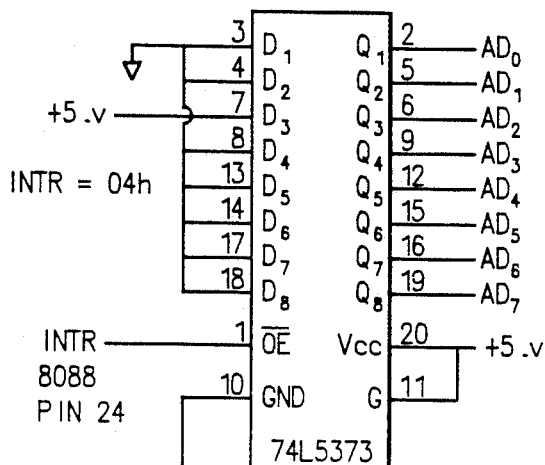
FIG. 20 is a schematic wiring diagram of a INTR circuit.

Whenever the W output goes to a 1, an INTR (04h) interrupt is generated. This occurrence is acknowledged by the INTA signal generated by circuit shown in FIG. 20. The software records that currently the steering is turning in the direction indicated by the X output. When the W output returns to the 0 condition, another INTR interrupt is generated. The Y signal is assessed, and the software deciphers at this point whether any real turning has been accomplished and updates the appropriate counter accordingly.

In order to generate an interrupt any time the W signal changes, INTR was connected to an EXCLUSIVE OR gate, along with an output signal from the computer. By this design, the computer can adjust its output to the EXCLUSIVE OR gate so that an interrupt may be generated for any change of W.

Two factors are significant to the design of automated electric steering responsive to the signals generated by the sensing means. The motor must have sufficient torque to turn the steering wheel decisively at any time, even when there is minimal movement of the vehicle and subsequent excessive tire friction. Moreover, the motor must turn the steering in a timely manner. Turning the steering wheel one revolution per second is adequate in practice.

The transmission as illustrated by FIG. 3 resulted in an overall gear reduction of 13 63. The rating of motor 40 was 800 RPM maximum with 24 volts and 8.8 amps at full load. This arrangement yielded an estimated steering wheel speed of 58.6 RPM, or approximately one revolution per second. This design yielded sufficient torque, with 12 volts applied, to turn the steering wheel decisively on dry pavement with no vehicular motion.

All this electric steering apparatus was mounted on a ¾ inch piece of plywood in the same plane as the axis of the steering wheel shaft. Chain 40 was used to assure no slippage in the low RPM, high torque environment. Slippage would have been unacceptable because of the switches on the sprocket 47B of the intermediate shaft 47 responsible for steering wheel position sensing.

As noted, the steering wheel shaft 46 was driven by a 30 tooth sprocket, driven by an 11 tooth sprocket on the intermediate shaft 47, yielding a gear ratio of 2.72. Because two magnets are mounted on the large sprocket 47B of the intermediate shaft 74, the sensing switches are actuated twice per revolution, or 5.45 times per revolution of the steering wheel. For the particular pickup truck used as the tractor 31 for this example, the steering can be turned from a straight ahead position, a maximum of three turns to the left or three turns to the right. Therefore, from the straight ahead position, the sensing switches could generate a maximum 16 pulses when the steering wheel was turned completely to either the left or the right.

Each of the A/D converters 60, 75 had an independent running clock using a 220 pf capacitor and a 10K ohm resistor, resulting in a clock frequency of approximately 320 KHZ, yielding a maximum conversion time of approximately 230 microseconds. An analog to digital conversion was started by performing a software write to the converter when the converter was chip selected. The completed conversion is signaled by a pulse on the INTR output line (FIG. 22). To avoid the need for circuitry to latch this pulse, the computer remained idle in a wait loop after each conversion was initiated. After sufficient time had elapsed for the longest possible conversion, the digital number was read from the A/D converter.

Figure 23:
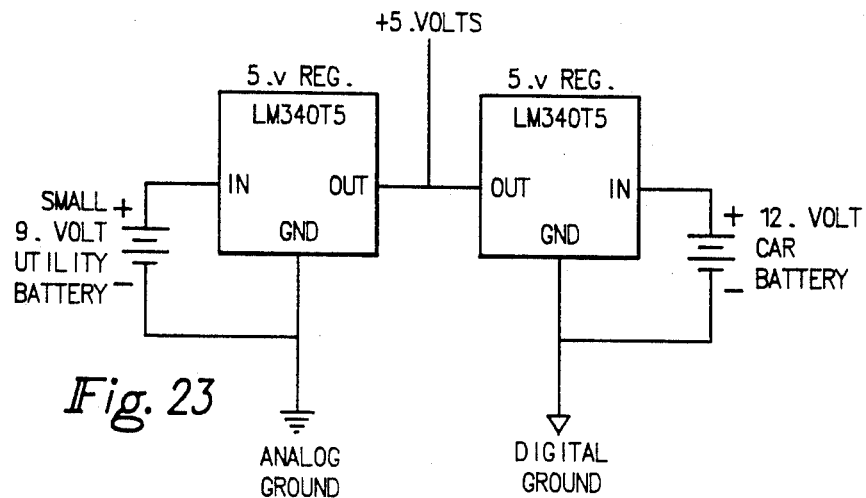
FIG. 23 is a schematic wiring diagram of a 5 volt analog supply.

Separate analog and digital ground connections are provided on a typical A/D converter. In such cases, the plus supply voltage of the analog and digital supplies necessarily share the same IC connection. In order to provide an electrically pure analog supply voltage with an independent ground, the circuitry shown by FIG. 23 was used. 5 volt analog supply powered the two A/D converters 60, 75 and their associated potentiometers 50, 61. The ball potentiometer 61 was mounted so that 2.50 volts would be on the potentiometer wiper when the trailer 33 was directly behind the tractor 31. This condition was defined as zero degrees ball angle. The bumper angle B was defined to be zero degrees when the string 37 is extended straight back behind the trailer parallel the trailer reference axis 34. In a similar manner, 2.5 volts was on the potentiometer 50 wiper when the bumper angle B was zero degrees.

When at 0 degrees, this arrangement provided 2.50 volts to either A/D converter 60, 75, which converts to $80_{16}$. The software subtracted from this $80_{16}$ to yield 0, or 0 degrees. If the potentiometer provided 2.48 volts, the resultant digital number was $7F_{16}$. When $80_{16}$ is subtracted, the resultant number is $FF_{16}$, which in the 2's complement number system, represents a negative 1 degree. This result indicated the trailer to be toward the driver's side 1 degree. Positive numbers represented the degree to which the trailer is on the passenger side. In summary, this system provided a signed number representing the sensed ball angle and bumper angle.

The potentiometer 61 was supplied with 5.0 volts. Movement of the arm 66 1.44 degrees caused a change of 0.02 volts to the voltage to the A/D converter 75. When the arm 66 moved 360 degrees, the voltage to the A/D converter changes by 5.00 volts. To get 1 degree movement of the arm 66 to correlate to 1 numerically, the potentiometer 66 would have needed to be supplied with 7.2 volts. As a practical matter, however, the input to the A/D converter 75 could not be greater than the supply voltage. An error in ball angle A readings was thus introduced.

There was also a component of ball angle error due to the mounting of the potentiometer 61. The potentiometer 61 was actually mounted 1.75 inches offset from the center of the hitch 35. Accordingly, if the actual ball angle A was, for example, about 35 degrees, then the angle of the arm 66 was about 28.8 degrees, and the A/D converted number was 20.0 degrees. Locating the potentiometer 1.75 inches away from the ball was determined to introduce a maximum nonlinearity error of about 2 percent.

Figure 24:
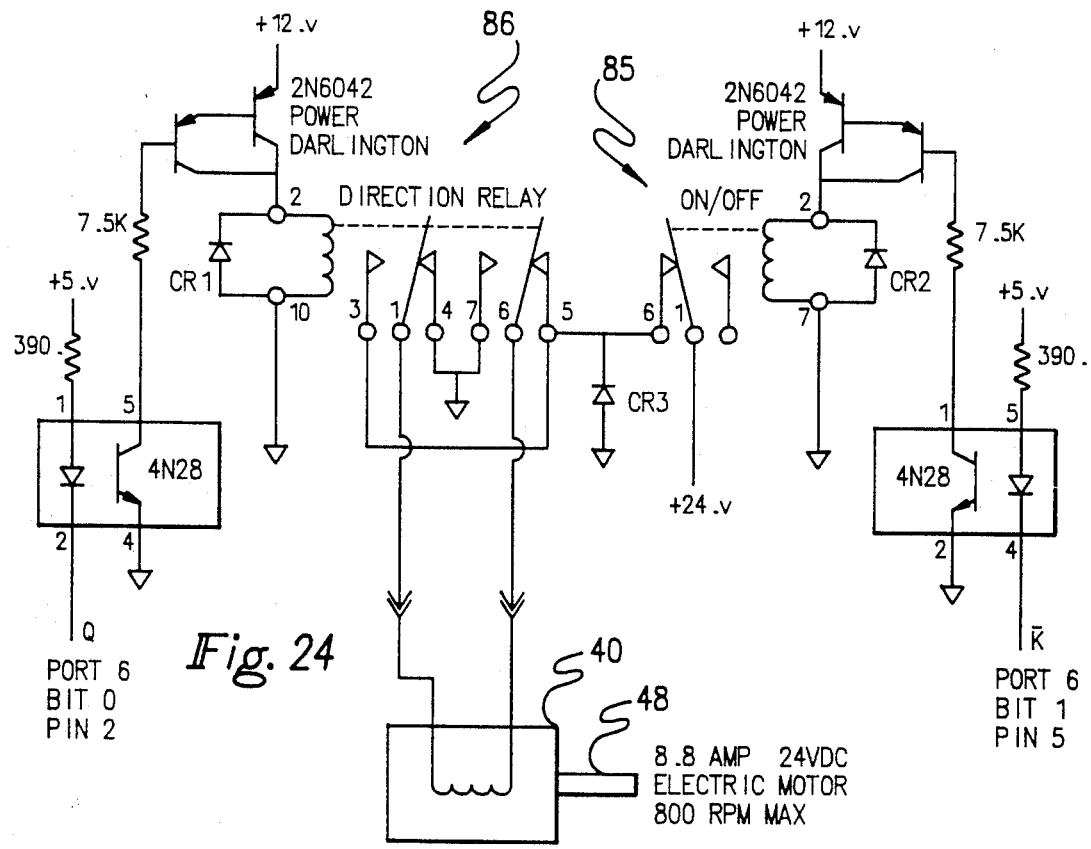
FIG. 24 is a schematic wiring diagram of an electric control circuit.

The control circuitry shown in FIG. 24 permitted powering the steering motor 40 from an independent supply. There were two computer control signals to the steering motor; namely on/off and direction. These signals drove optical isolators, which in turn drove power transistors that powered two separate relay coils 85, 86, as shown.

One relay 86 controls which direction the motor is to turn; the other relay 85 turns the power on. A counter EMF diode, CR3, conducts when the steering motor is turned off. This diode also serves as a brake when power is removed, retarding the steering from recoil as a result of tension in the steering mechanism from tire/road friction.

String distance d was measured by an optical encoder, which is integrated in the same packaging as the string tension motor. This optical encoder circuitry provides a single TTL output, which generates 500 pulses (1000 transitions) per revolution. This signal serves as an input to a counter in the Intel 8155 chip. This counter is programmed to produce one square wave output for every 250 positive input transitions. The counter output drives the positive edge sensitive NMI input of the 8088 so the software can keep an account of string travel. During backing, the computer was informed when the driver reached the target by virtue of how much string had been retracted. More sophisticated embodiments are within contemplation whereby a map is created in the computer by recording the string travel to the target. The steering may then respond to and be guided by the stored map without further real time input concerning the target vector.

The system as embodied in the example fully automates tractor steering to place the associated trailer at a destination up to 150 feet from the place of origin. Among other things, it was demonstrated that this system effectively avoided the peril of a jackknife condition when the destination point is defined at a right angle to the trailer bumper.

There was a near relationship of steering and resultant ball angle for the tractor-trailer assembly. It was also found that the ball angle for a given radius of turn is the same whether in reverse or forward travel. On the basis of these two principles, the correct nominal steering to maintain given ball angle can be computed.

The destination point to which the trailer was to be backed was defined by a string. The computer was configured to be continuously updated with the current bumper angle with respect to the target destination point. The backing algorithm used was to adjust the steering to cause the current ball angle to be equal to the current bumper angle.

The difference between current ball angle and desired ball angle (ball angle error) was the basis for corrective steering. The ball angle error was multiplied by 4, to yield the corrective steering. Moving the steering count by 1 resulted in a ball angle change of 2 degrees. To oversteer by a factor of 1 would be to correctively steer 1 count for each 2 degrees of ball error. This adjustment would result in no corrective steering action. The steering would simply be adjusted for the radius of the current ball angle, not the oversteering necessary to correct for the desired ball angle. To oversteer by a factor of 4 is to correctively steer 2 counts for each degree of error. Utilizing software based upon an algorithm for oversteering by a factor of 4 effected a dynamic steering response to error correction. Oversteering by a factor of 2 would execute correct backing, though less responsive and more prone to error.

The system of this invention may be embodied in versions which are either more elaborate or less elaborate than the illustrated example.

A system in which the driver does the steering is within contemplation. Visual arrows or lights could indicate to the driver appropriate corrective steering measures. Such a system could also have audio indicators to specify right and left steering needs. The audio would allow the driver to concentrate on the outcome of backing by looking at backing mirrors. This approach would help preclude an accident in which the trailer might be jackknifed or driven into an obstruction while the driver was looking at steering indicators.

Steering sensing could be eliminated in driver-steered systems. Current steering could be determined by judging the dynamic change of ball angle per reverse distance traveled. This traveled distance could be determined by the string being retracted. A more accurate system could use a sensor on the drive shaft of the tractor.

It may be possible to develop a reliable algorithm by simply assessing the dynamics of change in ball angle. Such a system would not depend upon knowledge of the steering setting. The principal operative would be dynamics of change. Every time the ball angle changed, the computer would indicate appropriate correcting steering.

The system of this invention may be adapted to control backing of the towing vehicle to a fixed point, such as the hitch of an unattached trailer. This option enhances the system by assisting the driver in getting the trailer connected to the towing vehicle. In such an embodiment, a string might be drawn from the ball of the towing vehicle to the hitch of the trailer. This system could seek steering for a 0 degree angle at the ball sensor. Backing would cease when the string was completely retracted.

Other embodiments may utilize software that automatically determines the steering characteristics of the towing vehicle (the amount of steering for a given radius turn). If the hitch to axle distance were known, a software algorithm could determine the steering characteristics of the towing vehicle by computing the current radius based on the current ball angle. With such a system, the correcting steering table could automatically be generated for a given towing vehicle. The system would then be adaptable to whatever towing vehicle was attached.

Other software may automatically determine the ball/axle distance of the trailer. If the steering characteristics of a given tractor are known, then the ball/axle distance can be easily determined. The current steering setting, and subsequent radius with associated ball angle, provide sufficient information to compute ball/axle distance.

Additional software may allow remote control of the steering. This system could allow the user to specify the desired radius, not the desired steering, thereby circumventing the possibility of a jackknife condition. With the aid of a small cable of three wires, the steering could be done by a person removed from the vehicle some 50 to 100 feet. A radio-controlled model could also be developed.

Software for backing a defined path is also within contemplation. The software of this example is designed to back to a defined point. Alternative software could record the path taken as the string is withdrawn. The computer could follow the path given in the course of going to the defined point.

If the very same backing path is to be followed repetitively, such a path could be stored in memory. This stored path could be recalled as desired for subsequent backing. A desired backing path could be stored during forward travel. Appropriate software could thus convert the forward path into reverse path information. With such a system, the driver could drive forward through the path that was desired for subsequent backing. Such path information could be permanently stored for frequently needed backing paths, such as one's driveway.

Reference herein to details of the illustrated embodiments is not intended to limit the scope of the appended claims.

What is claimed:

1. A system for coordinating the respective orientations of the tractor and the trailer components of a tractor-trailer assembly in which the normal straight ahead towing orientations of said tractor and trailer position a first longitudinal reference axis of said tractor and a second longitudinal reference axis of said trailer within a common, approximately vertical reference plane, during backing of said assembly, comprising:

a coupling assembly positioned approximately within said plane and including a tractor element intersected by said first reference axis and a trailer element intersected by said second reference axis, said tractor and trailer elements being coupled to permit pivoting movement of said trailer component with respect to said tractor component approximately transverse said plane at a reference pivot axis;

first sensing means structured and arranged to determine the angle formed by the intersection of said first and second reference axes at said pivot axis;

target determination means associated with said trailer component structured and arranged to determine a radius vector between a reference location of said trailer component and a remote target location;

second sensing means structured and arranged to determine the angle formed by the intersection of the projection of said vector with said second reference axis; and responsive means operatively associated with said first and second sensing means, said responsive means being structured and arranged to react to the said determinations of said first and second sensing means whereby to determine continuously during said backing appropriate corrections to the steering of said tractor component necessary to maintain said trailer component on course towards said target location.

2. A system according to claim 1 wherein said responsive means includes display means which reveal said angles determined by said first and second sensing means.

3. A system according to claim 2 wherein said target determination means includes a spooled line having a free end, said spooled line being included in structure permitting said free end to be positioned at said target location.

4. A system according to claim 3 wherein the vector defined by said target determination means originates at the back end of said trailer in the approximate vicinity of said plane, whereby to define a bumper angle.

5. A system according to claim 4 wherein said tractor element of said coupling assembly comprises a ball, whereby said first and second reference axes define a ball angle.

6. A system according to claim 5 wherein said responsive means includes means for comparing the ball angle revealed by said first sensing means and the bumper angle revealed by said second sensing means, whereby to determine the corrective steering required to adjust said ball angle to approximate said bumper angle.

7. A system according to claim 6 including drive means connected through transmission means to a steering axle of said tractor and constructed and arranged for control by said responsive means, whereby to effect changes in said ball angle by driving said steering axle in response to divergences between said ball angle and said bumper angle.

* * * * *